Patented Oct. 2, 1934

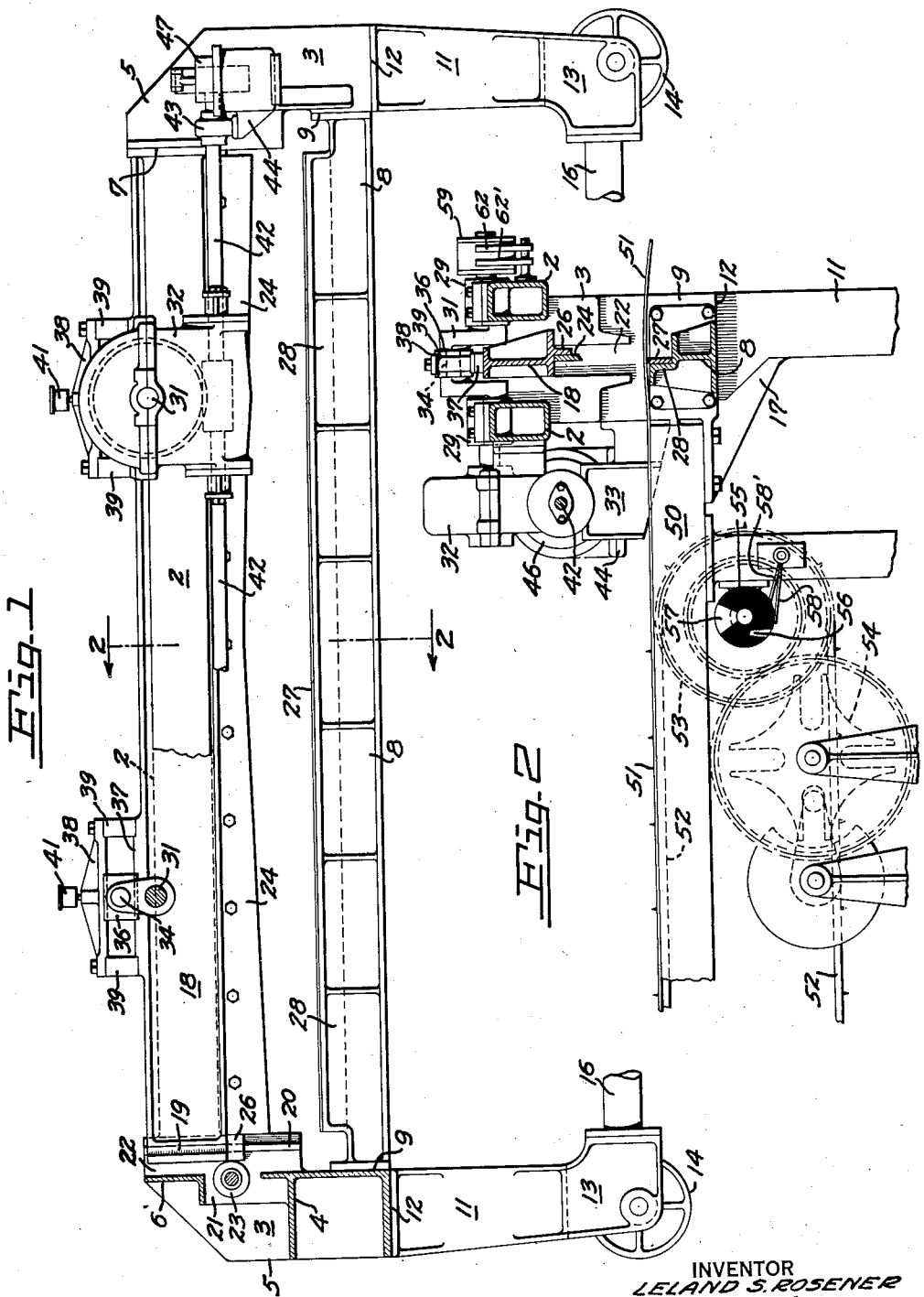

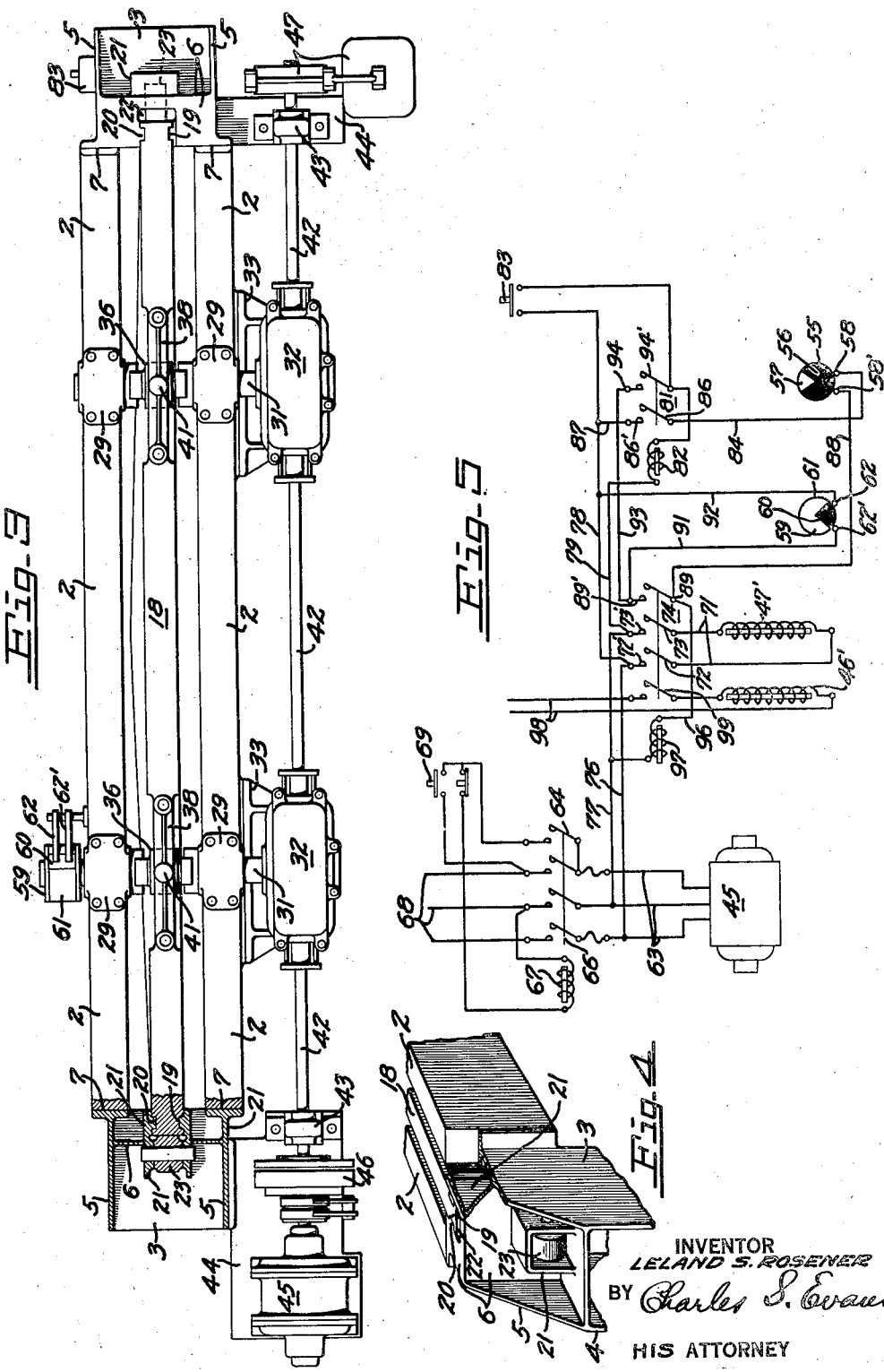

1,975,650

UNITED STATES PATENT OFFICE 1,975,650

SHEAR

Leland S. Rosener, San Francisco, Calif., assignor to The Paraffine Companies, Inc., San Francisco, Calif., a corporation of Delaware Application September 28, 1929, Serial No. 395,807

6 Claims. (Cl. 164—48)

My invention relates to a shear, particularly to a power shear which may be used in connection with any machine from which a product is desired to be cut; and an object of my invention is the provision of a power shear that is adapted to be synchronized with the correlated machine.

Another object of my invention is the provision of a power shear that is portable and capable of independent operation.

Another object of the invention is the provision of a shear of compact structure, composed of few and simple operating parts, and characterized by economy of manufacture.

Another object of my invention is the provision, in a power shear of the character described, of means for stopping the cutting blade at a predetermined and desirable position.

A further object of the invention is the provision of a power shear capable of cutting material from a web thereof which is moved, with a periodic motion, through the shear, and provided with means for timing the operation of the cutting knife to effect movement thereof when the material is at rest.

My invention possesses other objects and features of advantage, some of which with the foregoing will be set forth in the following description of my invention, which is illustrated in the drawings accompanying and forming part of the specification. It is to be understood that I do not limit myself to the showings made by the said description and drawings, as I may adapt varying forms of my invention within the scope of the claims.

Referring to the drawings:

Figure 1 is a front elevational view of the shear of my invention. Part of the structure is omitted from the view and parts are shown in section to disclose clearly the construction.

Figure 2 is a vertical sectional view through the shear, taken in a plane indicated by the line 2—2 of Figure 1, and illustrates in elevation a portion of a printing machine in connection with which the shear may be used.

Figure 3 is a plan view of the shear of Figure 1, parts being shown in section to disclose clearly the construction.

Figure 4 is a perspective view of a portion of the slidable knife mounting, portions of the structure being omitted from the view to disclose clearly the construction.

Figure 5 illustrates diagrammatically the wiring used in connection with the shear of my invention.

In terms of broad inclusion, the shear of my invention comprises preferably a portable supporting frame having a knife movably mounted thereon. Drive means is provided for operating the knife; and a brake, cooperating with the drive means, is provided for stopping the knife at a predetermined position of its movement. If it is desired to use the shear in connection with an already existing machine adapted to feed material periodically, means is provided for correlating the action of the shear with that of the machine, so that cutting action is effected when the material to be cut is at rest.

In greater detail, the shear is supported by a frame comprising the hollow, rectangularly shaped side beams 2, sized between and suitably secured to the end supports 3, so that the side beams are spaced in a substantially parallel and horizontal position. Supports 3 are made up of the U-shaped bases 4 having the side flanges 5 integrally formed on the ends thereof. A cross piece 6 forms an integral part of the flanges 5 on each base 4, and has faces 7 to which the side beams 2 are secured. An I-beam 8, having its upper surface of substantially Z-shaped cross section, is secured to the faces 9 of the bases 4, so that it lies below, between and substantially parallel to the side beams 2.

The described structure is mounted on pedestals 11, suitably secured to the faces 12 on the under portions of bases 4. The lower portions of these pedestals are provided with yokes 13, in which are journaled the supporting wheels or rollers 14; thus making the shear transportable. To give stability to the structure, tie rod 16 is secured between the yokes 13. Although only two pedestals and supporting wheels are shown, it is obvious that two more may be provided, thereby making the shear frame a regular four wheeled carriage.

When using the shear with an already existing machine, means is provided for securing the shear thereto. This securing means preferably comprises the brackets 17 forming a part of the shear frame, and adapted to be bolted to the delivery table 50 of the correlated machine. This arrangement is clearly shown in Figure 2. It is obvious that in connection with varying types of correlated machines, various means for securing the shear thereto may be incorporated.

An I-beam 18, is slidably mounted on the supports 3 in such position as to be spaced between the side beams 2 and above the lower I-beam 8. Such slidable mounting preferably comprises grooves 19 formed in the sides of I-beam 18 adjacent its ends, and spaced guide rails 20 integral with flanges 21 providing sides for the apertures 22 in cross pieces 6. The guide rails 20 engage in grooves 19. This construction, as most clearly shown in Figure 4, greatly lessens the entrance of grit into the slides. The ends of I-beam 18 project into apertures 22; and in order to take up end thrust of this I-beam and lessen wear on the slideways, thrust rollers 23 are journaled in flanges 21, so as to bear against the ends of the I-beam in all positions of its up and down movement. The thrust rollers also insure accuracy of the cutting operation, if play develops in the slideways.

The cutting action is effected by two knife blades, each mounted in an I-beam and adapted, during the downward movement of upper I-beam 18, to form a shear therebetween. Upper knife 24, having preferably a V-shaped concavity and a beveled cutting edge, is secured to flange 26 formed on the lower face of the slidable I-beam; so that when this I-beam moves downwardly in the slideways, the cutting edge of the upper knife forms a shear with the cutting edge of the lower knife 27. The lower knife is preferably formed with a straight beveled cutting edge, and is secured to a flange 28 which forms a part of the Z-shaped upper surface of fixed I-beam 8. By the concave shape of the movable blade, material to be cut is first gripped at both sides simultaneously during the cutting operation, thereby insuring smooth and even cutting.

Means are provided for effecting reciprocation of the movable cutting knife 24. Journaled in the bearings 29 secured on the upper surfaces of side beams 2, are the crankshafts 31 terminating in the gear housings 32, which in turn are mounted adjacent one of beams 2 by means of the brackets 33. Crank pins 34 of crankshafts 31, are journaled in the crankpin shells 36 slidably mounted in the movable I-beam, between the wearing plates 37 formed on the top side of the beam and the yokes 38 spaced in fixed position from the wearing plates by means of the spacers 39. Conventional grease cups 41 provide lubricant housings for the crankpins and sliding shells. It is evident from the above described construction, that when the crankshafts are rotated cutting action is effected.

Crankshafts 31 are driven by means of the driving shaft 42 through conventional worm gear drives arranged in the gear housings 32, and having preferably a reduced gear ratio of 20 to 1. Driving shaft 42 is journaled in the gear housings 32, and in the pillow blocks 43 mounted on the brackets 44, suitably secured to the shear frame. It is thus seen that when the driving shaft is rotated, the crankshafts are also driven, but at a slower speed due to the gear ratios. These gear ratios may, of course, be varied to suit the circumstances. Torque is supplied to the driving shaft, to effect rotation thereof, by means of any suitable electric motor 45 mounted on one of the brackets 44.

At the commencement of the cutting operation, the movable knife is at its uppermost position; and since only one downward stroke is sufficient to effect cutting of material, means are provided for automatically stopping movement of the knife after the cutting operation and at the upper position of its return stroke; so that the succeeding cutting action will be subjected to the impact of a complete downward stroke. Such means include a clutch 46 interposed between the motor shaft and the driving shaft, and mounted adjacent the motor. Clutch 46 is preferably a magnetic clutch of any conventional construction, such as any of the well known electro-magnetic types in which engagement is effected by the application of suitable current. The means also include brake 47, mounted on the bracket 44 at the end opposite the motor bracket. The brake is preferably of any well known magnetic type, which normally locks the driving shaft to prevent movement thereof, but which may be released as long as it is energized by suitable current. Both the clutch and brake are correlated for operation to perform the function described. For the purpose of illustrating such operation, I have chosen for explanation control means applicable when the shear is used in connection with a machine for feeding material with a periodic motion.

A portion of such machine is illustrated, more or less diagrammatically, in Figure 2. The machine is a conventional rug printing machine which feeds the rugs with a periodic motion, so that designs may be imprinted therein while at rest. From the machine, the rugs are led in considerable lengths into drying stalls; and it is for the purpose of cutting the rugs so as to fit in the stalls that the shear may be employed. It is obvious that the rugs should be cut while at rest, and not while moving. Briefly, the machine comprises the delivery table 50 over which the web of material 51 is moved by an endless belt 52 passing over pulley 53, which is driven with a periodic motion by means of a conventional "Geneva Star" drive 54.

Mounted for rotation with pulley 53 is a circularly shaped interrupter 55 provided with an insulating segment 56 and a contacting segment 57. The positioning of the segments is such that when the sheet material is at rest, the contacting segment 57 bears against a pair of contact brushes 58 and 58'. It is thus seen that a circuit may be closed through these brushes when material is at rest. An interrupter 59 having the insulating segment 60 and the contacting segment 61 is mounted for rotation with one of crankshafts 31 of the shear. The insulating segment 60 is so positioned that it contacts with brushes 62 and 62' when the movable cutting knife is in elevated position. In such position, it is apparent that a circuit may be broken through brushes 62 and 62'.

The circuits, the interrupters, clutch 46, brake 47 and motor 45, for correlating the operation of the shear and machine, and for effecting stopping of the movable knife in proper position, are illustrated diagrammatically in Figure 5. Motor 45, which is preferably an alternating current motor, is connected by leads 63 with a conventional motor starting and magnetic switch comprising switch arms 64, connected by an armature 66 actuated by magnet 67; and the switch is connected with a suitable source of current by leads 68. For closing and opening the circuit through the motor starting switch, a conventional switch button 69 is employed.

Brake 47 is preferably operable by alternating current; therefore the same source of current as that for the motor 45 may be used for the brake. The brake coil 47' is connected by leads 71 to the two central poles 72 and 73 of a conventional four pole magnetic switch 74, similar in construction to that of the motor starting switch; and the contacts 72' and 73' for these poles are connected by leads 76 and 77 to leads 63. A branch circuit derived from leads 76 and 77, and comprising leads 78 and 79, connects with the operating magnet 82 of a two pole magnetic switch 81, and is controlled by a push button 83.

A lead 84, connected to one of the poles 86 of the magnetic switch 81, is also connected with one of the brushes 58 of interrupter 55. The contact 86′ for pole 86 is connected to lead 78 by lead 87. The other brush 58′ of interrupter 55 is connected by lead 88 to end pole 89 of switch 74; the contact 89′ for said pole being connected by lead 91 to brush 62′ of interrupter 59. Brush 62 of interrupter 59 is connected by lead 92 to lead 78; and contact 89′ of magnetic switch 74 is also connected by lead 93 to the second contact 94 of switch 81; the pole 94′ of said contact being connected in the lead connecting the switch magnet 82 and push button 83. Connected to pole 89 of magnetic switch 74 is a lead 96, which connects to lead 77, and includes the switch magnet 97 of magnetic switch 74.

Clutch 46 is preferably operated by an independent source 98 of direct current, due to the smoother action obtained by employing direct current for clutches of this character. The coil 46′ of clutch 46 is connected to the free pole 99 of magnetic switch 74.

*Operation.*—Considering the cutting knife at rest and in elevated position and the control circuits open, the clutch 46 is disengaged and the brake 47 locks the shaft 42. In this position, contactor segment 61 of contactor 59 bridges brushes 62 and 62′. Just prior to the time when it is desired to cut material, push button 69, which may be located at any convenient position preferably on the shear, is pressed to start motor 45. However, clutch 46 is not in condition to be engaged and brake 47 is not in condition to be released, until push button 83 is pressed. The latter is preferably located on the shear.

When the operator observes that the strip is approaching a position of rest, which is the desired position for cutting, push button 83 is pressed. This closes switch 81, which remains closed owing to its magnet circuit being completed through the pole 94′ and the contacting segment 61. The switch 74 however remains open until the strip of material stops moving. As previously explained, contactor segment 57 of interrupter 55 bridges brushes 58 and 58′ to close the circuit through the switch magnet 97 only when the material is at rest. Once closed the switch 74 maintains itself in this condition; the circuit of the magnet 97 being completed through the pole 89 of switch 74 and the contacting segment 61. The closing of the switch 74 also completes the circuits through the clutch 46 and brake 47, to simultaneously engage the clutch and release the brake, so as to operate the shear. Thus, the shear blade moves down to cut the material immediately after the sheet has come to rest. This action of the shear is consequently automatic and is timed with the movement of the material, as has already been described in detail.

It is to be noted that the push button 83 is pressed during the movement of the material preceding the rest period when the sheet is to be cut. The cutting action will be automatically effected as soon as the material is at rest, due to the fact that the circuit through magnetic switch 74 is completed when the contact segment 57 bridges brushes 58 and 58′, which occurs as soon as material stops moving. Since the shear is rapid in its action, the period during which the material is at rest gives ample time for effecting the cutting. By regulating the speed of the shear motor 45 the speed of operation of the shear may be varied.

Upon return of the movable cutting knife to elevated position, insulating segment 60 of interrupter 59 will bridge brushes 62 and 62′, to break the operating circuits of switches 74 and 81, thereby opening the switches. This causes clutch 46 to disengage, and brake 47 to engage shaft 42. Upon application of the brake, stopping of the shear will be effected, there being sufficient lag so that contact segment 61 of interrupter 59 may bridge the brushes 62 and 62′, thus leaving the circuit conditioned for further operation of the shear.

Although I have described the operation of the shear for use in connection with a machine for feeding material with a periodic motion, it is apparent that the shear may be used separately, and control circuits employed for the clutch and brake in accordance with the teachings of my invention.

The shear is constructed of any suitable metal generally employed for such purposes.

I claim:

1. The combination, means for feeding material with an intermittent motion, a shear comprising a knife having a period of rest, means for moving the knife from said position to cut the material, means operatively connecting the knife moving means with said feeding means, a brake operatively connected with said knife moving means, and means operating in time with the movement of said knife for actuating the brake to stop the knife in said position.

2. The combination, means for feeding material with an intermittent motion, a shear comprising a knife having a period of rest, means for moving the knife from said position to cut the material, a clutch interposed in said moving means and normally disengaged when the knife is at rest, a brake for holding the knife against movement while in said position, and means operatively connected with the feeding means for engaging the clutch and releasing the brake.

3. The combination with a machine which feeds material with an intermittent motion, of a shear comprising a movable knife for cutting the material, a magnetic clutch and brake operatively connected with said knife, an electric circuit for controlling the operation of said clutch and brake, means interposed in said circuit and operating in time with the movement of said material for closing the circuit to engage the clutch and release the brake to move the knife, and means interposed in said circuit and operating in time with the movement of said knife for opening the circuit to release the clutch and set the brake to stop the knife.

4. In combination, means for feeding material, a shaft rotating with the feeding means, means for cutting the material, a shaft for driving the cutting means, a magnetic clutch interposed in said drive shaft, a magnetic brake connected with the drive shaft, an electric circuit for controlling the operation of said clutch and brake, a rotatable interrupter interposed in said control circuit and mounted for rotation with the first mentioned shaft for simultaneously engaging the clutch and releasing the brake, and a second interrupter interposed in said circuit and mounted for rotation with said drive shaft for releasing the clutch and setting the brake.

5. In combination, means for feeding material, means for cutting the material, a magnetic clutch and brake operatively connected with the cutting means, an electric circuit for controlling the operation of said clutch and brake, means interposed in said control circuit and operating in time with the feeding means for simultaneously engaging the clutch and releasing the brake, and means interposed in said circuit and operating in time with the cutting means for simultaneously releasing the clutch and setting the brake.

6. In combination, means for feeding material, means for cutting the material, a magnetic clutch and brake operatively connected with the cutting means, a magnetic switch connected in circuit with the clutch and brake, a control circuit for the switch, means interposed in the control circuit and operating in time with the feeding means for closing the switch to engage the clutch and release the brake, and means interposed in the control circuit and operating in time with the cutting means for opening the switch to release the clutch and set the brake.

LELAND S. ROSENER.